(12) United States Patent
Uhlir-Tsang et al.

(10) Patent No.: US 6,852,153 B2
(45) Date of Patent: Feb. 8, 2005

(54) NONIONIC ADDITIVES TO CONTROL PUDDLING IN INKJET INKS

(75) Inventors: Linda C. Uhlir-Tsang, Corvallis, OR (US); John R Moffatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 103 days.

(21) Appl. No.: 10/254,315

(22) Filed: Sep. 24, 2002

(65) Prior Publication Data

US 2004/0055506 A1 Mar. 25, 2004

(51) Int. Cl.$^7$ .............................................. C09D 11/02
(52) U.S. Cl. .................. 106/31.27; 106/31.58
(58) Field of Search ............................. 106/31.27, 31.58

(56) References Cited

U.S. PATENT DOCUMENTS

| | | | | |
|---|---|---|---|---|
| 4,165,399 A | * | 8/1979 | Germonprez | ................ 427/264 |
| 4,166,044 A | * | 8/1979 | Germonprez et al. | .... 106/31.43 |
| 5,211,747 A | * | 5/1993 | Breton et al. | ............. 106/31.34 |
| 5,626,655 A | | 5/1997 | Pawlowski et al. | ...... 106/31.27 |
| 5,709,737 A | * | 1/1998 | Malhotra et al. | ........ 106/31.43 |
| 5,785,743 A | | 7/1998 | Adamic et al. | .......... 106/31.27 |
| 5,837,044 A | | 11/1998 | Santilli et al. | |
| 5,837,046 A | | 11/1998 | Schofield et al. | |
| 5,891,232 A | * | 4/1999 | Moffatt et al. | ........... 106/31.89 |
| 5,891,934 A | * | 4/1999 | Moffatt et al. | .............. 523/161 |
| 5,935,309 A | | 8/1999 | Moffatt et al. | |
| 5,946,012 A | | 8/1999 | Courian et al. | ................ 347/63 |
| 6,149,719 A | | 11/2000 | Houle | ..................... 106/31.14 |
| 6,177,485 B1 | | 1/2001 | Moffatt et al. | .............. 523/160 |
| 6,235,099 B1 | | 5/2001 | Aida et al. | ................ 106/31.65 |
| 6,290,331 B1 | | 9/2001 | Agarwal et al. | .............. 347/47 |
| 2002/0035172 A1 | | 3/2002 | Waki et al. | |
| 2004/0035323 A1 | * | 2/2004 | Suzuki et al. | ............. 106/31.65 |

FOREIGN PATENT DOCUMENTS

| | | |
|---|---|---|
| DE | 19848843 | 4/1999 |
| EP | 0602551 | 12/1992 |
| EP | 1236778 | 9/2002 |
| JP | 200038533 | 2/2000 |

\* cited by examiner

*Primary Examiner*—Helene Klemanski

(57) ABSTRACT

A puddling additive comprising a nonionic, polar group and a $C_6$–$C_{30}$ hydrocarbon tail for use in reducing puddling in an inkjet ink. The inkjet ink also comprises a dye and an ink vehicle. A method of reducing puddling in an inkjet ink is also disclosed. The method comprises adding a puddling additive to the inkjet ink, wherein the puddling additive comprises a nonionic, polar group and a $C_6$–$C_{30}$ hydrocarbon tail.

19 Claims, No Drawings

NONIONIC ADDITIVES TO CONTROL PUDDLING IN INKJET INKS

BACKGROUND OF THE INVENTION

1. Field of the Invention

The present invention relates to an additive used to control puddling in inkjet inks. More specifically, the invention relates to a puddling additive having a nonionic, polar group and a $C_6$–$C_{30}$ hydrocarbon tail.

2. State of the Art

Inkjet printing is a popular alternative for home and office printing due to the low cost of inkjet printers, advances in quality of the printed images, and the relatively noise-free operation. Notwithstanding these advantages, research and development continue in order to improve inkjet print quality while maintaining a reasonable cost for the inkjet printer and the printing process.

A conventional color inkjet printer comprises a plurality of resistor elements arranged in a particular pattern in a printhead. The resistor elements are located in a chamber that is provided with an opening for inkjet ink to enter from a reservoir. Together, the printhead and the reservoir comprise an inkjet pen. The printhead also includes an orifice plate having a plurality of orifices through which inkjet ink is expelled toward a print medium. Each resistor element is connected by a conductive trace to a microprocessor, where current-carrying signals cause one or more selected resistor elements to heat up. The heat creates a bubble of vapor ink in the chamber, which is expelled through the orifices toward the print medium. The properly sequenced ejection of inkjet ink from each orifice causes characters or other images to be printed on the print medium as the printhead is moved across the print medium. The inkjet printers produce high quality printing and are both compact and affordable. In addition, since only the ink strikes the paper, the inkjet printer is fast and quiet.

To print color images, inkjet printing uses a combination of cyan, magenta, yellow, and, optionally, black inkjet inks to produce all the colors of a color spectrum. The cyan, magenta, yellow, and, optionally, black inkjet inks are referred to collectively as a "set" of inkjet inks. A color inkjet printer typically has four inkjet pens, one pen for each of the inkjet inks. Color inkjet inks are typically aqueous-based and are formulated by dissolving or dispersing a colorant, such as a dye or pigment, in an aqueous ink vehicle. For example, a yellow inkjet ink uses a yellow dye or pigment dissolved or dispersed in the ink vehicle, while a blue inkjet ink uses a cyan dye or pigment dissolved or dispersed in the ink vehicle. If the colorant is a dye, the dye is typically present in a salt form. The ink vehicle comprises additional components depending on the application and desired properties of the color inkjet ink, as known in the art.

To produce high quality images, the inkjet ink must be compatible with the inkjet pen and the print medium. The properties of an optimal inkjet ink include, among others, good crusting resistance, good stability, low color-to-color bleed, and rapid dry time. In addition, the inkjet ink must be capable of passing through the inkjet orifice without clogging the orifice or puddling on the orifice plate. The inkjet ink should also permit rapid cleanup of the machine components with minimal effort. Although inkjet inks are known to possess one or more of the foregoing properties, few inkjet inks possess all of these properties because an improvement in one property often negatively impacts another property.

While the overall print quality of currently produced inkjet inks is generally high, puddling of these inks still occurs on the orifice plate of the printhead. Magenta inkjet inks typically exhibit worse puddling than cyan and yellow inkjet inks. Puddling occurs when the ink that is ejected through the orifices does not reach the print medium. Instead, the inkjet ink collects on an outer surface of the orifice plate or puddles adjacent to the edge of the orifice. This occurs when ink drops exiting the orifices leave behind minute amounts of ink on the orifice plate around each orifice. The extent of the puddling varies from a few, small drops of ink to the formation of large puddles on large portions of the orifice plate. Large puddles partially or completely block the orifices and cause missing nozzles, false low decap values, or changes in the trajectory of the ink drops. The change in trajectory results in the ink drop not hitting its targeted pixel center, which creates printing errors on the media and reduces the quality of the printed image.

Various solutions to address the problem of puddling have been proposed. Some solutions propose modifying the printhead or pen to reduce puddling, while other solutions modify the inkjet ink composition. For example, a coating of hydrophobic material is applied to the printhead to reduce its wettability and, thereby, reduce puddling. However, this modification to the printhead is costly. A combination of pen architecture and modifications to the inkjet ink composition have also been suggested to improve puddling.

Proposed modifications to the inkjet inks include adding anionic and nonionic surfactants to the inkjet ink. Similarly, adding a first surfactant and a second surfactant to improve puddling has been proposed. The first surfactant has a hydrophilic-lipophilic balance ("HLB") value of 1.5 units lower than the second surfactant. Additional modifications include adding salts to the inkjet inks. However, adding salts or surfactants causes reliability and materials interaction issues because these additives cannot be used with all dyes or ink vehicles. In addition, adding surfactants or salts negatively affects desirable properties of the inkjet inks.

It would be desirable to improve puddling of inkjet inks by using additives that are effective in low amounts and do not negatively affect other properties of the inkjet inks. In addition, it would be desirable to use additives that are effective in many types of ink vehicles.

BRIEF SUMMARY OF THE INVENTION

A puddling additive used in an inkjet ink is disclosed. The puddling additive comprises a nonionic, polar group and a $C_6$–$C_{30}$ hydrocarbon tail. Preferably, the nonionic, polar group is an alcohol, alkene, or zwitterionic group and is attached to a saturated or unsaturated $C_6$–$C_{30}$ hydrocarbon tail. Preferably, the $C_6$–$C_{30}$ hydrocarbon tail has between 8 and 18 carbons.

A method of reducing puddling in inkjet inks is also disclosed. The method comprises adding a puddling additive to the inkjet ink. The puddling additive has a nonionic, polar group and a $C_6$–$C_{30}$ hydrocarbon tail.

A set of inkjet inks is also disclosed. Each inkjet ink comprises a dye, an aqueous ink vehicle, and a puddling additive, which comprises a nonionic, polar group and a $C_6$–$C_{30}$ hydrocarbon tail.

DETAILED DESCRIPTION OF THE INVENTION

A nonionic additive used to control puddling in an inkjet ink is disclosed. The inkjet ink comprises a dye, an ink vehicle, and a puddling additive, which includes a nonionic, polar group and a $C_6$–$C_{30}$ hydrocarbon tail. A set of inkjet inks, each comprising the puddling additive, is used in a color printer. A method of reducing puddling in inkjet inks is also disclosed. The method comprises adding a puddling additive to the inkjet ink, where the puddling additive comprises a nonionic, polar group and a $C_6$–$C_{30}$ hydrocarbon tail. A set of inkjet inks is also disclosed.

The amounts of the components in the inkjet ink are expressed in weight percent ("wt %") of the total weight of the ink composition. The purity of all components is that used in normal commercial practice for inkjet inks.

An inkjet ink of the present invention may comprise a colorant, such as a dye or pigment, an ink vehicle, and a puddling additive. If the colorant is a dye, the dye may be nonionic, cationic, anionic, or a mixture of nonionic, cationic, and/or anionic dyes. Dyes are well known in the art and are commercially available from numerous sources including, but not limited to, Avecia (Wilmington, Del.), Mitsubishi Chemical Corp. (Tokyo, Japan), and Ilford AG (Fribourg, Switzerland). The dyes included may be Acid dyes, Direct dyes, Food dyes, Mordant dyes, or Reactive dyes and may be water-soluble or water-insoluble. Examples of dyes include, but are not limited to, sulfonate and carboxylate dyes, such as those dyes that are commonly employed in inkjet printing. Specific examples of dyes that may be used in the inkjet ink include, but are not limited to, Sulforhodamine B (sulfonate), Acid Blue 113 (sulfonate), Acid Blue 29 (sulfonate), Acid Red 4(sulfonate), Rose Bengal (carboxylate), Acid Yellow 17 (sulfonate), Acid Yellow 29 (sulfonate), Acid Yellow 42 (sulfonate), Acridine Yellow G (sulfonate), Acid Yellow 23, Acid Blue 9, Nitro Blue Tetrazolium Chloride Monohydrate or Nitro BT, Rhodamine 6G, Rhodamine 123, Rhodamine B, Rhodamine B Isosyanate, Safranine O, Azure B, and Azure B Eosinate, all of which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow. The dye is not critical to the operability of the present invention and, therefore, the selection of dye is not discussed in detail. Rather, it is understood that one of ordinary skill in the art could select any suitable dye for use in the present invention.

In addition to color dyes or pigments, black dyes or pigments may be used in the inkjet ink. For example, Direct Black 154, Direct Black 168, Fast Black 2, Direct Black 171, Direct Black 19, Acid Black 1, Acid Black 191, Mobay Black SP, or Acid Black 2 may be used.

The dye may be present in the inkjet ink in a range from approximately 0.1 to approximately 15 wt % of the total weight of the inkjet ink, with approximately 0.5 to approximately 5 wt % being preferred. The amount of dye necessary in the inkjet ink is largely dependent on the solubility of the dye in the ink vehicle, the desired color to be achieved with the inkjet ink, and the purity and strength of the dye.

The ink vehicle may comprise an aqueous-based ink vehicle that includes water or a mixture of water and at least one water-soluble organic solvent. The water-soluble organic solvent may include, but is not limited to, an aliphatic alcohol, an aromatic alcohol, a diol, a glycol ether, a poly(glycol) ether, a caprolactam, a formamide, an acetamide, and a long chain alcohol, or mixtures thereof. Examples of organic solvents employed in the practice of this invention include, but are not limited to, primary alcohols of 30 carbons or less, primary aromatic alcohols of 30 carbons or less, secondary aliphatic alcohols of 30 carbons or less, secondary aliphatic alcohols of 30 carbons or less, 1,3-alkyldiols of 30 carbons or less, alkyltriols of 30 carbons or less, 1,□-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific organic solvents that are preferably employed in the practice of this invention include, but are not limited to, N-methyl pyrrolidone, 1,5-pentanediol, 2-pyrrolidone, diethylene glycol, 1,3-(2-methyl)-propanediol, 1,3,5-(2-methyl)-pentanetriol, tetramethylene sulfone, 3-methoxy-3-methylbutanol, glycerol, 3-pyridylcarbinol, pentaerythritol, 1,2-alkyldiols, and mixtures thereof. For instance, the water-soluble organic solvent in the ink vehicle may include a mixture of a diol, a polyglycol, and a glycol. The water-soluble organic solvent(s) is present in a range from approximately 0.01 to approximately 50 wt % of the total weight of the inkjet ink, with approximately 0.1 to approximately 20 wt % being preferred.

The ink vehicle may optionally include surfactants, humectants, buffers, preservatives, biocides, and/or viscosity modifiers, depending on the desired properties of the inkjet ink. For instance, at least one surfactant may be used in the ink vehicle. The surfactant may be a nonionic, amphoteric, or ionic surfactant. Nonionic and amphoteric surfactants include TERGITOL® compounds, which are alkyl polyethylene oxides available from Dow Chemical (Midland, Mich.); TRITON® compounds, which are alkyl phenyl polyethylene oxide surfactants available from Rohm & Haas Co. (Philadelphia, Pa.); BRIJ® compounds available from ICI Americas (Wilmington, Del.); PLURONIC® compounds, which are polyethylene oxide block copolymers available from BASF (Mount Olive, N.J.); SURFYNOL® compounds, which are acetylenic polyethylene oxides available from Air Products (Allentown, Pa.); polyethylene oxide ("POE") esters; POE diesters; POE amines; POE amides; and dimethicone copolyols. The concentration of surfactant employed in the present invention may range from approximately 0 to approximately 40 wt % of the total weight of the inkjet ink. Preferably, the surfactant is present at approximately 0.01% to 5 wt %.

Buffers may be used to maintain the inkjet ink at a desired pH. The buffer may be an organic-based biological buffer or an inorganic buffer. The buffers employed may provide a pH ranging from approximately 3 to approximately 9, preferably from approximately 6 to approximately 9, and most preferably from approximately 8 to approximately 8.5. Examples of buffers include Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO").

The puddling additive may comprise a nonionic, polar group and a $C_6$–$C_{30}$ hydrocarbon tail. The nonionic, polar group and $C_6$–$C_{30}$ hydrocarbon tail may be directly attached to one another or indirectly attached by a spacer. The term "nonionic, polar group" refers to a polar group having a neutral charge or a polar group having both a positive charge and a negative charge (a zwitterion), thereby effectively having an overall, neutral charge. The nonionic, polar group may include, but is not limited to, an alkane, an alkene, a polyethylene oxide, an ether, an alcohol, or a zwitterionic group.

The $C_6$–$C_{30}$ hydrocarbon tail of the puddling additive may be a saturated or unsaturated hydrocarbon chain comprising between 6 and 30 carbons. If the $C_6$–$C_{30}$ hydrocarbon tail is unsaturated, it may have at least one site of unsaturation (carbon-carbon double bond), with each site of unsaturation having either a cis or trans stereochemistry. The hydrocarbon chain may also be either a straight or branched chain.

An alcohol, alkene, or zwitterionic group may be used as the nonionic, polar group of the puddling additive. For instance, oleyl alcohol, which is available from Sigma-Aldrich Corp. (St. Louis, Mo.), has an alcohol group as the nonionic, polar group, trans-5-decene and trans-4-octene both have an alkene group as the nonionic, polar group and are also available from Sigma-Aldrich Corp. (St. Louis, Mo.). Oleyl dimethylamine oxide has a zwitterionic group as the nonionic, polar group and is available from Henkel Corp. (Düsseldorf, Germany). Hydrocarbon chains having between 8 and 18 carbons may be used as the $C_6$–$C_{30}$ hydrocarbon tail. Preferably, the hydrocarbon chains are straight chains and have between 0 and 1 site of unsaturation.

The puddling additive may be present in the inkjet ink in an amount effective to control puddling and may be soluble in the inkjet ink in the amount used. It is known in the art that longer chain hydrocarbons are less soluble in the ink vehicle than shorter chain hydrocarbons. Therefore, the length of the $C_6$–$C_{30}$ hydrocarbon tail of the puddling additive may be selected so that the puddling additive is soluble in the ink vehicle. The puddling additive may be present in an amount ranging from approximately 0.1 wt % to approximately 2.0 wt % of the total weight of the inkjet ink. The amount of puddling additive used in the inkjet ink is a minimal amount that is sufficient to control puddling without negatively impacting other properties of the inkjet inks. Since the amount of puddling additive is minimal and does not negatively impact other properties, the puddling additive may be used in a wide variety of ink vehicles. In addition, more than one puddling additive may be used in the inkjet ink to achieve the desired decrease in puddling.

The puddling additive may be commercially available in reagent grade purity (99+% purity). In addition, the puddling additive may be synthesized by techniques known in the art. For example, a puddling additive having an odd number of carbons in the hydrocarbon chain, a branched hydrocarbon chain, more than one site of unsaturation, or a stereochemistry that is not commercially available may be synthesized by techniques known in the art.

In one embodiment, the puddling additive has an alcohol as the nonionic, polar group and a hydrocarbon chain comprising 18 carbons as the $C_6$–$C_{30}$ hydrocarbon tail.

In another embodiment, the puddling additive has an alkene as the nonionic polar group and a hydrocarbon chain comprising between 8 and 10 carbons as the $C_6$–$C_{30}$ hydrocarbon tail.

In yet another embodiment, the puddling additive has a zwitterionic group as the nonionic, polar group and a hydrocarbon chain comprising 18 carbons as the $C_6$–$C_{30}$ hydrocarbon tail.

The components of an exemplary inkjet ink are shown in Table 1, along with ranges of the amount of each component. The inkjet ink may be cyan, magenta, yellow, or black, depending on the dye that is used.

TABLE 1

Components Of The Inkjet Ink Composition

| Component | Wt % |
| --- | --- |
| Dye | Approximately 0.5 to 5 |
| Diol/polyglycol ether/glycol ether | Approximately 10 to 15 |
| Buffer | Approximately 0.2 |
| Preservative/biocide | Approximately 0.05 to 0.5 |
| Surfactant | Approximately 0.02 to 4 |
| Puddling additive | Approximately 0.1 to 2.0 |
| Water | Remainder |

The inkjet inks are formulated by combining these components, using methods known in the art. The puddling additives described herein may be easily incorporated into existing formulation processes because the puddling additives are present in low amounts. Therefore, the puddling additive does not create solubility issues that require modifying existing formulation processes. Rather, the puddling additive is added to the inkjet ink along with other components of the inkjet ink. Since the puddling additives are easily incorporated into existing processes, the cost of reducing puddling is low.

Cyan, yellow, magenta, and black inks having the puddling additives described herein may be used in a set of inkjet inks in a color printer. The set of inkjet inks may be used to print high quality images on normal or specialty print media. While each of the inkjet inks in the ink set may comprise the puddling additive, it is also contemplated that the puddling additive may be present in at least one of the inkjet inks. For example, if puddling only occurs in the magenta ink of a particular set of inkjet inks, only that ink may include the puddling additive. In addition, each of the inkjet inks in the set may include the same puddling additive or may include a different, puddling additive.

EXAMPLE 1

Inkjet Ink Compositions

Magenta inkjet inks including the components listed in Table 1 were produced. The dye used in these inkjet inks was a magenta dye available from Mitsubishi Chemical Corp. (Tokyo, Japan). The puddling additives that were used in the magenta inkjet inks are listed in Table 2, along with the amount of the puddling additive that was tested.

TABLE 2

Puddling Results for Magenta Inkjet Inks

| General Chemical Category | Puddling additive | Amount of Puddling additive (wt %) | Chemical Formula | Puddling score (lower scores preferred) |
|---|---|---|---|---|
| Alcohol | Oleyl alcohol | 0.6 | $C_{18}H_{36}O$ | 0 |
| | Oleyl alcohol | 1.0 | $C_{18}H_{36}O$ | 0 |
| | Polyethylene (10) oleyl ether | 0.4 | $C_{18}H_{35}(OCH_2CH_2)_nOH$, n is approximately 10 | 1.6 |
| | Polyethylene (2) oleyl ether | 0.4 | $C_{18}H_{35}(OCH_2CH_2)_nOH$, n is approximately 20 | 2.2 |
| | Polyethylene (2) oleyl ether | 0.4 | $C_{18}H_{35}(OCH_2CH_2)_nOH$, n is approximately 2 | 4.0 |
| Alkenes | trans-5-decene | 0.6 | $C_{10}H_{20}$ | 0.3 |
| | trans-5-decene | 1.0 | $C_{10}H_{20}$ | 0.2 |
| | trans-4-octene | 0.4 | $C_8H_{16}$ | 1.1 |
| | trans-7-tetradecene | 0.4 | $C_{14}H_{28}$ | 4.3 |
| Zwitterionic surfactants | cis-oleyl dimethylamine oxide | 0.4 | $R(CH_3)_2N^+O^-$, R is oleyl | 0.4 |
| | cis-oleyl betaine | 0.4 | $CH_3(CH_2)_7CHCH(CH_2)_7CH_2N^+(CH_3)_2CH_2COO^-$ | 1.4 |
| Control Ink | None | | | 3.2 |

To act as a control, magenta inkjet inks lacking the puddling additive were also produced.

The inkjet inks were formulated by direct mixing of the components. The pH of the inkjet inks was adjusted to between approximately 8.0 and 8.5 by the addition of sodium hydroxide. At this pH range, the puddling additives were present as a sodium salt.

EXAMPLE 2

Puddling Results

The inkjet inks described in Example 1 were tested to determine their puddling characteristics. The inkjet ink was printed continuously over a full sheet of print medium. To determine the extent of puddling, the inkjet pen was removed before it was serviced and the amount of puddling on the printhead was visually observed.

Puddling was measured by visually observing the printhead after printing and assigning a "puddling score" to reflect the extent of puddling of each inkjet ink. A low puddling score indicated a low amount of puddling. Inkjet inks having a puddling score less than approximately 1.0 exhibited the greatest decrease in puddling. Puddling in each inkjet ink having the puddling additive was compared to puddling of a control inkjet ink. A ratio of the puddling score of each inkjet ink having the puddling additive to the puddling score of the control inkjet ink is reported in Table 2 as the "% of no additive."

As shown in Table 2, the inkjet inks comprising oleyl alcohol, trans-5-decene, trans-4-octene, and oleyl dimethylamine oxide exhibited the greatest reduction in puddling. Oleyl alcohol was tested at 0.6 and 1.0 wt % and showed improved puddling at both amounts.

The inkjet inks comprising trans-5-decene and trans-4-octene also showed improved puddling. Both of these puddling additives have an alkene group as the nonionic, polar group, while trans-5-decene has a $C_{10}$ hydrocarbon tail and trans-4-octene has a $C_8$ hydrocarbon tail.

Using oleyl dimethylamine oxide as the puddling additive also showed improved puddling in the inkjet inks. Oleyl dimethylamine oxide has a zwitterionic group as the nonionic, polar group and a $C_{18}$ hydrocarbon tail.

EXAMPLE 3

Additional Puddling Additives

Puddling additives having an alkane, a polyethylene oxide, or an ether as the nonionic, polar group are synthesized or purchased. In addition, puddling additives having a hydrocarbon chain comprising 6, 7, 9, or 11–17 carbons in the $C_6$–$C_{30}$ hydrocarbon tail are synthesized or purchased. Puddling additives having a hydrocarbon chain comprising between 19 and 30 carbons in the $C_6$–$C_{30}$ hydrocarbon tail are also synthesized or purchased.

The puddling additives are formulated into inkjet inks and printed as previously described. Inkjet inks comprising these puddling additives exhibit reduced puddling.

While the invention may be susceptible to various modifications and alternative forms, specific embodiments have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An inkjet ink with improved puddling, comprising:
   a dye;
   an inkjet vehicle; and
   a puddling additive comprising a nonionic, polar group selected from the group consisting of an alkane group, a polyethylene oxide group, an ether group, an alcohol group, an alkene group, and a zwitterionic group and a $C_6$–$C_{30}$ hydrocarbon tail, wherein the puddling additive is selected from the group consisting of trans-5-decene, trans-4-octene and oleyl alcohol.

2. The inkjet ink of claim 1, wherein the $C_6$–$C_{30}$ hydrocarbon tail is saturated.

3. The inkjet ink of claim 1, wherein the $C_6$–$C_{30}$ hydrocarbon tail is unsaturated.

4. The inkjet ink of claim 1, wherein the $C_6$–$C_{30}$ hydrocarbon tail has between 8 and 18 carbon atoms.

5. The inkjet ink of claim 1, wherein the pudding additive is present in the inkjet ink from approximately 0.4 percent by weight to approximately 1.0 percent by weight of a total weight of the inkjet ink.

6. An inkjet ink composition, comprising:
a set of cyan, yellow, magenta, and black inkjet inks, each inkjet ink comprising a dye, an ink vehicle, and a puddling additive, wherein the puddling additive comprises a nonionic, polar group selected from the group consisting of an alkane group, a polyethylene oxide group, an ether group, an alcohol group, an alkene group, and a zwitterionic group and a $C_6$–$C_{30}$ hydrocarbon tail, wherein the puddling additive is selected from the group consisting of trans-5-decene, trans-4-octene, and oleyl alcohol.

7. The inkjet ink composition of claim 6, wherein the $C_6$–$C_{30}$ hydrocarbon tail is saturated.

8. The inkjet ink composition of claim 6, wherein the $C_6$–$C_{30}$ hydrocarbon tail is unsaturated.

9. The inkjet ink composition of claim 6, wherein the $C_6$–$C_{30}$ hydrocarbon tail has between 8 and 18 carbon atoms.

10. The inkjet ink composition of claim 6, wherein each inkjet ink comprises a different puddling additive having the nonionic, polar group and the $C_6$–$C_{30}$ hydrocarbon tail.

11. A method of improving puddling in an inkjet ink, comprising:
adding at least one puddling additive comprising a nonionic, polar group selected from the group consisting of an alkane group, a polyethylene oxide group, an ether group, an alcohol group, an alkene group, and a zwitterionic group and a $C_6$–$C_{30}$ hydrocarbon tail to an inkjet ink, wherein the at least one puddling additive is selected from the group consisting of trans-5-decene, trans-4-octene, and oleyl alcohol.

12. The method of claim 11, wherein adding the at least one puddling additive comprising the nonionic, polar group and the $C_6$–$C_{30}$ hydrocarbon tail comprises adding a saturated hydrocarbon chain as the $C_6$–$C_{30}$ hydrocarbon tail.

13. The method of claim 11, wherein adding the at least one puddling additive comprising the nonionic, polar group and the $C_6$–$C_{30}$ hydrocarbon tail comprises adding an unsaturated hydrocarbon chain as the $C_6$–$C_{30}$ hydrocarbon tail.

14. The method of claim 11, wherein adding the at least one puddling additive comprising the nonionic, polar group and the $C_6$–$C_{30}$ hydrocarbon tail comprises adding a hydrocarbon chain having between 8 and 18 carbon atoms as the $C_6$–$C_{30}$ hydrocarbon tail.

15. The inkjet ink of claim 1, wherein the puddling additive is present in the inkjet ink from approximately 0.1 percent by weight to approximately 2.0 percent by weight of a total weight of the inkjet ink.

16. The inkjet ink composition of claim 6, wherein the puddling additive is present in each of the inkjet inks at from approximately 0.1 percent by weight to approximately 2.0 percent by weight of a total weight of the inkjet ink.

17. The inkjet ink composition of claim 6, wherein the puddling additive is present in each of the inkjet inks at from approximately 0.4 percent by weight to approximately 1.0 percent by weight of a total weight of the inkjet ink.

18. The method of claim 11, wherein adding the at least one puddling additive comprising a nonionic, polar group selected from the group consisting of an alkane group, a polyethylene oxide group, an ether group, an alcohol group, an alkene group, and a zwitterionic group and a $C_6$–$C_{30}$ hydrocarbon tail to the inkjet ink comprises adding the puddling additive to the inkjet ink in an amount ranging from approximately 0.1 percent by weight to approximately 2.0 percent by weight of a total weight of the inkjet ink.

19. The method of claim 11, wherein adding the at least one puddling additive comprising a nonionic, polar group selected from the group consisting of an alkane group, a polyethylene oxide group, an ether group, an alcohol group, an alkene group, and a zwitterionic group and a $C_6$–$C_{30}$ hydrocarbon tail to the inkjet ink comprises adding the puddling additive to the inkjet ink in an amount ranging from approximately 0.4 percent by weight to approximately 1.0 percent by weight of a total weight of the inkjet ink.

* * * * *